United States Patent [19]

Elfline

[11] Patent Number: 4,678,584

[45] Date of Patent: * Jul. 7, 1987

[54] METHOD OF REMOVING HEAVY METAL FROM WASTEWATER STREAMS

[75] Inventor: Geraldine S. Elfline, Morrison, Ill.

[73] Assignee: CX/OXYTECH, Inc., Yorkville, Ill.

[ * ] Notice: The portion of the term of this patent subsequent to Sep. 16, 2003 has been disclaimed.

[21] Appl. No.: 843,109

[22] Filed: Mar. 24, 1986

Related U.S. Application Data

[63] Continuation-in-part of Ser. No. 747,008, Jun. 20, 1985, Pat. No. 4,612,125.

[51] Int. Cl.$^4$ .................................................. C02F 1/52
[52] U.S. Cl. .......................... 210/719; 208/251 R; 208/179; 210/720; 210/721; 210/725; 210/904; 210/912; 210/913; 423/509; 423/561 R; 423/561 B
[58] Field of Search ................... 208/180, 251 R, 179, 208/181; 210/702, 705, 719, 720, 721, 722, 723, 724, 725, 727, 728, 729, 757, 758, 754, 756, 760, 904, 912–914; 423/11, 22, 34, 50, 55, 65, 85, 92, 101, 115, 140, 508, 509, 561 R, 561 B

[56] References Cited

U.S. PATENT DOCUMENTS

| | | | |
|---|---|---|---|
| 3,755,161 | 8/1973 | Yokota et al. | 210/679 |
| 3,826,741 | 7/1974 | Nakamura | 210/904 |
| 3,879,525 | 4/1975 | Miyata et al. | 423/311 |
| 3,966,601 | 6/1976 | Stevenson et al. | 210/710 |
| 4,166,032 | 8/1979 | Hanway et al. | 210/675 |
| 4,332,687 | 6/1982 | Daignault et al. | 210/721 |
| 4,425,230 | 1/1984 | Andress et al. | 209/167 |
| 4,431,524 | 2/1984 | Norman | 208/180 |
| 4,459,237 | 7/1984 | Bresson et al. | 209/167 |
| 4,599,177 | 7/1986 | Hayashi et al. | 210/719 |
| 4,612,125 | 9/1986 | Elfline | 210/724 |

FOREIGN PATENT DOCUMENTS

| | | | |
|---|---|---|---|
| 116988 | 8/1984 | European Pat. Off. | |
| 47-25088 | 10/1972 | Japan | 210/913 |
| 53-110993 | 9/1978 | Japan | 210/705 |
| 56-168881 | 12/1981 | Japan | 210/735 |

*Primary Examiner*—Peter Hruskoci
*Attorney, Agent, or Firm*—Mason, Kolehmainen, Rathburn & Wyss

[57] ABSTRACT

A method for treating a heavy metal-containing liquid, such as a wastewater stream, oil for recycling, or other metal-bearing liquid, with a trithiocarbonate, particularly an alkali metal trithiocarbonate, such as sodium trithiocarbonate, to precipitate the metals as insoluble sulfides. The precipitated metal sulfides are recovered as a low volume sludge, which can be processed through standard metallurgical techniques to yield the metals in economically useful forms. Among the most unexpected results produced by this method is the lowering of the selenium content in a naturally occurring body of water from 1.0 ppm to 0.0015 ppm.

19 Claims, No Drawings

4,678,584

METHOD OF REMOVING HEAVY METAL FROM WASTEWATER STREAMS

CROSS REFERENCE TO RELATED APPLICATION

This application is a continuation-in-part of my pending prior application Ser. No. 747,008 filed June 20, 1985, now U.S. Pat. No. 4,612,125.

FIELD OF THE INVENTION

The present invention is directed to a method for removing heavy metals from wastewater, oils or other liquids and more particularly to a method for treating these heavy metal-containing liquids with a trithiocarbonate, particularly an alkali metal trithiocarbonate, such as sodium trithiocarbonate ($Na_2CS_3$) to precipitate heavy metals therefrom as insoluble metal sulfide.

BACKGROUND OF THE INVENTION AND PRIOR ART

Federal, state and local governmental bodies reacting to constituent pressures have instituted a series of laws and regulations aimed at preventing the continued contamination of the environment. Heavy metals are generally defined as hazardous and, therefore, must be removed from industrial effluent streams. Once removed from these streams, the heavy metals-containing waste has been containerized and then disposed of in government-sanctioned landfills. These special landfills are now being more closely monitored thereby forcing alternative methods of disposal of these solid heavy metal wastes. It is toward both the clean-up of these effluent streams and discontinued pollution of soil and ground waters that the invention of this method is directed.

The metals plating and finishing industries have been moving to a "zero-discharge" basis for disposal of metal-bearing wastewater streams. Progressively stricter regulatory criteria have forced industry to drastically reduce the residual metal contents in wastewater discharges, while the increased cost of disposal of solid metal wastes have forced industries to examine the economic benefits of both "zero-discharge" for effluent waste streams and of the recovery and recycling of the removed heavy metal from these waste streams. As a result, instead of discharging the "used" industrial process water directly into municipal sewer systems or directly into natural bodies of water, this "used" water is to be recycled through the plant or manufacturing facility that generated it for treatment and recovery.

The ability of conventional wastewater treatment methods to achieve the low levels of residual metals required by the higher standards for wastewater purity in many cases is marginal. In addition, most conventional methods of heavy metals removal produce copious amounts of sludge, usually classified a priori as a hazardous material. Recent legislation has made the disposal of sludge material extremely difficult and expensive and no near term solution to the sludge disposal problem seems apparent.

Because of these problems, industry in general, and the metal plating and finishing segments in particular, have been forced to consider alternative methods for heavy metals removal from wastewater streams. The major characteristics needed in heavy metals removal from wastewater streams are: ability to reduce residual metal contents to extremely low levels (ultimately to the parts-per-billion range); production of minimal amounts of sludge, from which metals can be reclaimed and recycled; economical operation; production of effluent suitable for recycle to process operations; and ability for maximum retrofit into existing installations.

One of the more promising new alternative approaches that possesses the potential of fulfilling to a significant degree these desirable requirements for treating metal-bearing wastewaters is xanthate technology. A patent to John Hanway Jr., et al, U.S. Pat. No. 4,166,032, discloses the use of cellulose xanthate for heavy metals removal from wastewater streams. While cellulose xanthate is very effective for the removal of heavy metals from wastewater, the cellulose xanthate adds an amount of sludge equal to the dry weight of the cellulose xanthate added to the wastewater stream further increasing both the weight and volume of the sludge generated and to be treated. In accordance with the present invention, it has been found that trithiocarbonates, and particularly alkali metal trithiocarbonates, effectively precipitate heavy metals from wastewaters leaving a substantially nonpolluted solution or effluent capable of plant recycle or legal discharge. In addition, the low volume of generated sludge can be easily recycled using existing technology.

SUMMARY OF THE INVENTION

In brief, the present invention is directed to a method for treating a heavy metal-containing liquid, such as a wastewater stream; oil for recycling; or other metal-bearing liquid. The process of the present invention is useful on any heavy metal-bearing liquid such as those obtained as waste products in a metal finishing or plating operation, mining operations, milling operations, naturally occurring liquids or any other liquid containing one or more heavy metal ions. In accordance with the present invention, a heavy metal-containing liquid is treated with a soluble trithiocarbonate to precipitate the heavy metals for further treatment to separate the metals from the liquid.

Accordingly, an object of the present invention is to provide a method for treating metal-bearing liquids to cause precipitation of a substantial portion of the metals therefrom.

Another object of the present invention is to provide a method for treating heavy metal-bearing water or other liquids with soluble trithiocarbonate, and particularly an alkali metal trithiocarbonate.

Still another object of the present invention is to provide a method for removing heavy metals from an aqueous wastewater stream, oil or other liquid while allowing for a metal sludge that lends itself to be reclaimed for recycling.

Yet another object of the present invention is to provide a method for treating heavy metal-bearing wastewater streams or other liquids with an alkali metal or alkaline earth metal trithiocarbonate as a solid or in solution to remove sufficient heavy metals for recycle of the treated water or other liquid to an industrial process.

DETAILED DESCRIPTION OF THE PREFERRED EMBODIMENTS

In accordance with the principles of the present invention, residual metal contents in the low parts-per-million or parts-per-billion range may be obtained by mixing a water soluble trithiocarbonate, and particularly one or more alkali metal or alkaline earth trithiocarbonates into the metal containing water, oil or other liquid.

TRITHIOCARBONATES

The trithiocarbonate compound can be any water soluble trithiocarbonate where the cation is not polluting or toxic in solution. Suitable cations include one or more of the alkali metal, alkaline earth metal, ammonium, alkylammonium or hydroxyalkylammonium trithiocarbonates.

The ammonium, alkali metal and alkaline earth metal trithiocarbonates are water soluble and provide the trithiocarbonate anion $CS_3=$ in solution capable of reaction with heavy metals such as lead (Pb), zinc (Zn), copper (Cu) and iron (Fe) to produce a heavy metal sulfide. The most suitable trithiocarbonates are the sodium (Na), calcium (Ca) or potassium (K) salts. The sodium salt was used in most of the initial testing because it is the least expensive and most abundant. It may be identified by using any one of the accepted chemical formulae based on commonly used nomenclature, such as, (1) the anhydrous salt—$Na_2CS_3$ 2) the acid salt—$CH_2S_3.2Na$ or 3) the hydrated salt—$Na_2CS3.xH_2O$. The sodium salt of the trithiocarbonates has several possible names such as: sodium thiocarbonate, sodium trithiocarbonate, sodium sulfocarbonate or disodium carbonotrithioic acid.

Sodium trithiocarbonate is available commercially in a concentrated aqueous solution, and there are several methods for the synthesis of sodium and other trithiocarbonates. The most common method involves reacting an aqueous solution of sodium hydroxide (NaOH) with carbon disulfide ($CS_2$), in accordance with the following equation:

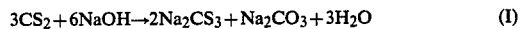

$$3CS_2 + 6NaOH \rightarrow 2Na_2CS_3 + Na_2CO_3 + 3H_2O \quad (I)$$

Any water soluble alkali metal or alkaline earth metal hydroxide may be substituted for the sodium hydroxide in the above equation. A second method involves the reaction of sodium sulfide ($Na_2S$) with carbon disulfide ($CS_2$), in accordance with the following equation:

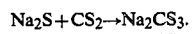

$$Na_2S + CS_2 \rightarrow Na_2CS_3.$$

Any alkali metal sulfide may be substituted for the sodium sulfide in the above equation. A third method for obtaining sodium trithiocarbonate is recovery of $Na_2CS_3$ as one of the secondary products in the manufacturing process for cellulose xanthate. An excess of carbon disulfide and sodium hydroxide are used in the process for manufacturing cellulose xanthate and combine to produce $Na_2CS_3$, $Na_2CO_3$ and water, as described in equation (I) above.

The method used for the synthesis of a trithiocarbonate is not critical nor is the concentration of the trithiocarbonate in solution as used to precipitate the heavy metals as sulfides. To achieve the full advantage of the present invention, the trithiocarbonate is added to the heavy metal-contaminated liquid in an amount sufficient for reaction with substantially all of the heavy metals in the liquid, and such that there is essentially no excess trithiocarbonate. This is achieved by the addition of the trithiocarbonate to the contaminated liquid in a molar amount equal to or slightly greater than the molar amount of heavy metals in the contaminated liquid, to essentially provide one trithiocarbonate anion $CS_3=$ for each atom of heavy metal anion to be removed from solution. A mole of trithiocarbonate will practically remove a mole of heavy metal from solution. In accordance with the principles of the present invention, heavy metal ions are removed from solution by reaction with a trithiocarbonate by contacting the metal, in solution, with a trithiocarbonate soluble in the metal-contaminated liquid, to form an insoluble sulfide and thereafter separating the sulfide and any sludge from the liquid, such as by settling and filtration.

Although the trithiocarbonate anion is the precipitating agent for each of the heavy metals, certain metal-bearing solutions may require a pretreatment step either to oxidize or reduce the metal to the correct valence state or to destroy certain interfering ions, molecules, or complexes prior to the addition of the trithiocarbonate. For instance, pretreatment can be used for the destruction of ions such as cyanide by pre-reacting the solution with hypochlorite, chlorine gas, ozone or other oxiding agent. Likewise, in order to facilitate removal chromium from solution, it is recommended that a reducing agent such as hydrazine or sodium metabisulfite be used. Such an agent is first added to reduce any hexavalent chromium ions to tri-valent chromium ions and thereby achieve maximum trithiocarbonate reaction and separation. Among the most startling and unexpected results of the present invention is the lowering of the selenium content in a naturally occurring body of water from 1.0 ppm to 0.0015 ppm, which is due in part to reducing the selenium to its lowest positive oxidation state with hydrazine before the addition of the trithiocarbonate anion. It has also been found that ammonium-complexed nickel solutions are more amenable to treatment with the trithiocarbonate anion if the solution is either first treated with sodium diethyldithiocarbamate or the carbamate is added in conjunction with the trithiocarbonate. The carbamate itself does not precipitate the nickel, but, through a catalytic effect or the formation of a new nickel complex, diethyldithiocarbamate addition leads to much faster nickel precipitation when the trithocarbonate anion is added. Optimum treatment of a heavy metal-bearing liquid also may involve the final adjustment of the pH of the solution to a range of 6-9 to maximize the precipitation of the metal sulfide and to comply with municipal sewer requirements. However, when municipal sewer requirements are not a factor, heavy metal separation with trithiocarbonate, outside of the pH range of 6-9, has proved satisfactory. An example of each of these cases is presented below.

In accordance with an important feature of the present invention, contact of the liquid to be treated with the trithiocarbonate creates an insoluble heavy metal sulfide. In this solid form, these metal ions are easy to separate and dewater from the effluent through any one of several commonly used physical means such as filtration, centrifugation or clarification. After separation of the solid phase, these metal sulfides can be converted to the metal oxides by subjecting the sulfides to a simple ore roasting process, as is well known in the art. The combined metal oxides can then be separated into the individual metals by standard industrial practices, and converted into economically useful forms.

EXAMPLES

Unless otherwise noted, the following examples were conducted using the following procedure.

1. All treated samples were 500 milliliters.
2. The final pH of the treated sample was 6-9.5 adjusted, if necessary, using either sodium hydroxide or dilute sulfuric acid.

3. The trithiocarbonate used was sodium trithiocarbonate in a five percent (W/W) aqueous solution.

4. A slight excess of this 5% solution was used to insure complete precipitation of the heavy metal ions present.

5. After the addition of the sodium trithiocarbonate, the reacting solution was stirred for approximately five minutes.

6. The completed reaction was allowed to settle for approximately thirty minutes.

7. Upon settling, the treated sample was filtered using a 0.45 micron filter membrane.

8. The filtrate was then analyzed for residual heavy metals.

9. The analysis of both the untreated (head) sample and the treated sample was done using atomic absorption spectrophotometry.

10. Any other reagents used are noted.

11. All values reported are expressed as parts-per-million (ppm).

EXAMPLE 1

Quality control test using a simulated effluent.

One milliliter of 5% sodium trithiocarbonate was used.

| Heavy metal present | Cu | Pb | Zn |
| --- | --- | --- | --- |
| Untreated | 15.38 | 9.77 | 26.68 |
| Treated | .08 | .19 | .11 |

EXAMPLE 2

Effluent from a battery manufacturer.

Five tenths (0.5) milliliter of 5% sodium trithiocarbonate was used.

Heavy metal present Pb

Untreated sample 16.97

Treated sample 0.08

EXAMPLE 3

Effluent from a battery manufacturer.

Four tenths (0.4) of a milliliter of 5% sodium trithiocarbonate was used.

Heavy metal present Pb

Untreated sample 7.12

Treated sample 0.12

EXAMPLE 4

Effluent from a battery manufacturer.

Five tenths (0.5) of a milliliter of 5% sodium trithiocarbonate was used.

| Heavy metal present | Pb | Cu | Fe |
| --- | --- | --- | --- |
| Untreated sample | 12.9 | .17 | 3.8 |
| Treated sample | .03 | .08 | .22 |

EXAMPLE 5

Effluent from a plating plant

Four milliliters of 5% sodium trithiocarbonate were used.

| Heavy metal present | Zn | Cu | Pb | Ni |
| --- | --- | --- | --- | --- |
| Untreated sample | 1.17 | 53.5 | 190.7 | 88 |
| Treated sample | .06 | .08 | .08 | .12 |

EXAMPLE 6

Effluent from a galvanizing plant

Twenty milliliters of 5% sodium trithiocarbonate were used.

| Heavy metal present | Pb | Zn | Fe |
| --- | --- | --- | --- |
| Untreated sample | .84 | 670 | 523 |
| Treated sample | .13 | .52 | .23 |

EXAMPLE 7

Outfall from a paint spray booth

Five tenths (0.5) milliliter of 5% sodium trithiocarbonate was used. This sample was first treated with one milliliter of 97% aqueous hydrazine to reduce the hexavalent chromium to tri-valent chromium.

| Heavy metals present | Cu | Cr |
| --- | --- | --- |
| Untreated sample | 12.00 | .93 |
| Treated sample | .08 | .36 |

EXAMPLE 8

Effluent from a decorative chrome plater 0.15 milliliter of 5% sodium trithiocarbonate was used. 0.5 milliliter of 97% aqueous hydrazine was used first to reduce the hexavalent chromium to trivalent chromium.

| Heavy metal present | Cu | Zn | Ni | Cr |
| --- | --- | --- | --- | --- |
| Untreated sample | .58 | .19 | .62 | 3.4 |
| Treated sample | .08 | .04 | .06 | .68 |

EXAMPLE 9

Water from a natural source containing selenium.

1.5 milliliters of 97% hydrazine was used to reduce the valence of the selenium ions to their lowest common stable oxidation state. To this treated sample one milliliter of 5% sodium trithiocarbonate was added.

Heavy metal Se

Untreated sample 1.0

Treated sample 0.0015

EXAMPLE 10

Sample of a lead-bearing paint used as an underbody coating in the automobile industry.

Eight milliliters of 5% sodium trithiocarbonate were used.

Heavy metal present Pb

Untreated sample 536

Treated sample 0.26

EXAMPLE 11

Sample from a copper plater, wherein the plating bath contained cyanide. The sample had been pretreated by the customer using chlorine gas.

Three tenths (0.3) of a milliliter of $Na_2CS_3$ was used.

Heavy metal present Cu

Untreated sample 15.8
Treated sample 0.10

EXAMPLE 12

Sample from a copper plater, wherein the plating bath contains a chelating agent. Twenty-two milliliters of 20% sodium trithiocarbonate were added and then the pH was lowered to 5.0.
Heavy metal present Cu
Untreated sample 2600
Treated Sample 0.14

EXAMPLE 13

Sample from a brass foundry.
Five tenths (0.5) of a milliliter of 5% sodium trithiocarbonate was used.

| Heavy metal present | Cu | Pb | Zn | Ni |
|---|---|---|---|---|
| Untreated sample | 6.43 | 2.73 | 6.7 | .39 |
| Treated sample | .08 | .03 | .04 | .31 |

EXAMPLE 14

Effluent from an automobile plant containing a lead-bearing paint.
0.45 milliliters of 5% sodium trithiocarbonate was used.

| Heavy metal present | Pb | Zn | Cr |
|---|---|---|---|
| Untreated sample | 17.09 | 4.37 | 2.10 |
| Treated sample | .18 | .12 | .08 |

EXAMPLE 15

Sample is acid mine drainage.
6.5 milliliters of 5% sodium trithiocarbonate were used.

| Heavy metal present | Pb | Zn | Cu | Cd | Ni | Fe |
|---|---|---|---|---|---|---|
| Untreated sample | 2.46 | 8.83 | 1.18 | .36 | 1.90 | 620 |
| Treated sample | .20 | .07 | .01 | .01 | .23 | .43 |

EXAMPLE 16

Effluent from a large zinc plater. Effluent is discharged into a creek.
Two milliliters of 5% sodium trithiocarbonate were used.

| Heavy metal present | Cu | Zn | Cr |
|---|---|---|---|
| Untreated sample | .095 | 38.4 | 15.4 |
| Treated sample | .02 | .26 | .05 |

EXAMPLE 17

Sample is a lead-bearing oil.
The filter used in this test was a standard analytical laboratory filter. Five milliliters of 5% sodium trithiocarbonate were used.
Heavy metal present Pb
Untreated sample 198
Treated sample 15

EXAMPLE 18

Effluent from a cyanide zinc plater.
A diluted hypochlorite solution first was used as an oxidizing agent to destroy the cyanide.
Five tenths (0.5) of a milliliter of 5% sodium trithiocarbonate was used.
Heavy metal present Zn
Untreated sample 24.5
Treated sample 0.34

EXAMPLE 19

Sample from a nickel plater. Plating bath contains nickel as the ammonium complex, therefore, diethyldithiocarbamate as a sodium salt was added along with the sodium trithiocarbonate. Ten milliliters of sodium trithiocarbonate were used, with an equimolar amount of sodium diethyldithiocarbamate.

| Heavy metal present | Cu | Zn | Pb | Ni | Cd |
|---|---|---|---|---|---|
| Untreated sample | 9.86 | 185 | 1.33 | .80 | 140.1 |
| Treated sample | 2.6 | .09 | .04 | .08 | .08 |

EXAMPLE 20

Effluent from a battery manufacturer.
Five tenths (0.5) of a milliliter of 5% sodium trithiocarbonate was used in each of the treated samples. The final pH of each is noted.

| Heavy metal present | Pb | Final pH |
|---|---|---|
| Untreated sample | 12.9 | 2.4 |
| Treated sample A | <0.03 | 7.5 |
| Treated sample B | 0.1 | 2.4 |

What is desired to be secured by Letters Patent of the United States is:

1. A method of treating a heavy metal-containing liquid for removal of a substantial portion of heavy metal therefrom without the generation of a substantial quantity of sludge comprising:
   contacting said liquid with a water-soluble trithiocarbonate in an amount sufficient to react with said heavy metal and cause precipitation of a substantial portion of insoluble heavy metal from said liquid, and separating the precipitate from the liquid.

2. The method of claim 1 wherein the water-soluble trithiocarbonate is an alkali metal or alkaline earth metal trithiocarbonate salt selected from the group consisting of $Na_2CS_3$, $K_2CS_3$, $Li_2CS_3$, $CaCS_3$ and $MgCS_3$.

3. The method of claim 2 wherein the alkali metal trithiocarbonate salt is $Na_2CS_3$.

4. The method of claim 1 wherein the heavy metal precipitated from said liquid is selected from the group consisting of aluminum, scandium, titanium, vanadium, chromium, manganese, iron, copper, cobalt, nickel, selenium, zinc, gallium, germanium, ytterbium, zirconium, niobium, molybdenum, technicium, ruthenium, rhodium, palladium, silver, cadmium, indium, tin, antimony, hafnium, tantalum, tungsten, rhenium, osmium, iridium, platinum, gold, mercury, thallium, lead, bismuth or polonium or mixtures thereof.

5. The method of claim 4 wherein the heavy metal precipitated from said liquid comprises copper, zinc, lead, nickel, cadmium, chromium, iron, cobalt or selenium.

6. The method of claim 5 wherein the heavy metal precipitated from said liquid comprises selenium.

7. The method of claim 6, wherein said liquid comprises natural waters, wastewaters, manufacturing effluents, or water-containing mixtures.

8. The method of claim 1 wherein the said liquid includes an aqueous liquid.

9. The method of claim 8 wherein the said aqueous liquid comprises natural waters, manufacturing effluents, or water-containing mixtures.

10. The method of claim 8 including adjusting the pH of said liquid to a pH in the range of 4.5 and 12.5 prior to contacting said liquid with the trithiocarbonate.

11. The method of claim 8 including adjusting the pH of said liquid above 6.0 and below 9.0 after contacting said liquid with the trithiocarbonate.

12. The method of claim 1 wherein the liquid includes a non-aqueous liquid.

13. The method of claim 12 wherein the said non-aqueous liquid comprises oil, petroleum distillates or lubricants.

14. The method of claim 1 further comprising initially treating said liquid with an oxidizing agent to destroy interfering ions.

15. The method of claim 14 wherein said oxidizing agent is selected from the group ozone ($O_3$), chlorine gas ($C_{12}$) and hypochlorite ion ($OCl^-$).

16. The method of claim 14 wherein said interfering ion is cyanide ($CN^-$).

17. The method of claim 1 further comprising initially treating said liquid with a reducing agent to change the valence state of the metals in said liquid.

18. The method of claim 17 wherein said reducing agent is selected from the group hydrazine, sodium metabisulfite ($Na_2S_2O_5$), sodium thiosulfate ($Na_2S_2O_3$) and thiourea.

19. The method of claim 1 further comprising adding sodium diethyldithiocarbamate to said liquid in an amount sufficient to reduce precipitation time.

* * * * *